(12) United States Patent
Dickerson et al.

(10) Patent No.: US 6,674,781 B1
(45) Date of Patent: Jan. 6, 2004

(54) METHOD AND SYSTEM FOR FUELING A CLOSED CYCLE CHEMICAL OXYGEN IODINE LASER

(75) Inventors: Robert Allen Dickerson, Woodland Hill, CA (US); Alan Zachary Ullman, Northridge, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/223,209

(22) Filed: Aug. 19, 2002

(51) Int. Cl.[7] ............................................. H01S 3/095
(52) U.S. Cl. ........................................... 372/89; 372/90
(58) Field of Search .............................. 372/89, 55, 90

(56) References Cited

U.S. PATENT DOCUMENTS

| | | | | |
|---|---|---|---|---|
| 3,708,511 A | * | 1/1973 | Van Vliet et al. ............ 552/642 |
| 3,715,400 A | * | 2/1973 | Kierstead et al. ............ 568/379 |
| 3,720,622 A | * | 3/1973 | Bollyky ........................ 252/700 |
| 4,104,204 A | * | 8/1978 | Williams ....................... 521/32 |
| 4,116,781 A | | 9/1978 | Dorio et al. |
| 4,342,116 A | * | 7/1982 | MacKnight et al. .......... 372/89 |
| 4,345,984 A | * | 8/1982 | Mihelich ................ 204/157.69 |
| 4,350,575 A | * | 9/1982 | Porta et al. ................... 205/466 |
| 4,459,188 A | | 7/1984 | Rutherford et al. |
| 4,668,498 A | * | 5/1987 | Davis ........................... 423/579 |
| 5,199,041 A | | 3/1993 | Schmiedberger et al. |
| 5,321,094 A | * | 6/1994 | McGee ......................... 525/387 |
| 5,378,449 A | | 1/1995 | Dinges |
| 5,417,928 A | * | 5/1995 | McDermott ................... 372/89 |
| 5,507,935 A | * | 4/1996 | Coleman et al. ............. 204/409 |
| 5,658,488 A | | 8/1997 | Lonergan et al. |
| 5,705,622 A | * | 1/1998 | McCapra .................... 536/23.1 |
| 5,802,093 A | | 9/1998 | Townsend et al. |
| 5,837,206 A | * | 11/1998 | Traffenstedt et al. ......... 372/55 |
| 5,859,863 A | * | 1/1999 | Clendening et al. .......... 372/39 |
| 5,870,422 A | * | 2/1999 | Florentino et al. ............ 372/89 |
| 5,889,807 A | | 3/1999 | Cunningham et al. |
| 5,907,573 A | | 5/1999 | Ullman et al. |
| 6,007,323 A | * | 12/1999 | Kurata ........................... 431/2 |
| 6,010,640 A | | 1/2000 | Beshore et al. |
| 6,049,557 A | | 4/2000 | Cunningham et al. |
| 6,072,820 A | * | 6/2000 | Dickerson ..................... 372/89 |
| 6,099,805 A | * | 8/2000 | Hartlove ..................... 422/122 |
| 6,165,424 A | * | 12/2000 | Clendening et al. ........ 422/235 |
| 6,224,786 B1 | * | 5/2001 | Stelman ........................ 372/89 |
| 6,377,600 B1 | * | 4/2002 | Flegal .......................... 372/89 |
| 6,544,401 B1 | * | 4/2003 | Colic .......................... 205/400 |
| 2002/0067752 A1 | * | 6/2002 | Ullman et al. ................ 372/55 |
| 2002/0098246 A1 | * | 7/2002 | Howes ........................ 424/613 |

* cited by examiner

*Primary Examiner*—Paul Ip
*Assistant Examiner*—James Menefee
(74) *Attorney, Agent, or Firm*—Alston & Bird LLP

(57) ABSTRACT

A method of utilizing lithium hypochlorite and hydrogen peroxide to generate singlet delta oxygen, which is used as fuel for a COIL device. The invention also comprises a method of regenerating lithium hypochlorite from the side products of singlet delta oxygen production. Singlet delta oxygen is produced by reacting LiOCl with $H_2O_2$ to form LiCl, $H_2O$, and $O_2(^1\Delta)$. The singlet delta oxygen is used to power a COIL apparatus, and the remaining aqueous LiOCl/LiCl solution is considered a byproduct stream. The reactant hydrogen peroxide ($H_2O_2$) is preferably supplied as a vapor and the reactant LiOCl is supplied as a LiOCl-rich LiOCl/LiCl aqueous solution. Water is removed from the LiCl-rich LiOCl/LiCl aqueous byproduct stream and the LiCl in the byproduct stream is regenerated under basic conditions into LiOCl and water. The water that is removed from the byproduct stream is converted into hydrogen peroxide through a catalytic, electrochemical, or chemical process. Thus, the LiOCl based fuel cycle forms a true recycled laser fuel supply loop.

19 Claims, 1 Drawing Sheet

METHOD AND SYSTEM FOR FUELING A CLOSED CYCLE CHEMICAL OXYGEN IODINE LASER

FEDERALLY SPONSORED RESEARCH OR DEVELOPMENT

This invention was made with government support under contract D.A.S.G. 60-00-C-0079 awarded by the Department of the U.S. Army. The government has certain rights in this invention.

FIELD OF THE INVENTION

The invention relates to a closed cycle system which produces fuel for a chemical oxygen iodine laser (COIL) system. Particularly, the invention relates to the regeneration of lithium hypochlorite, which is used to generate singlet delta oxygen for use in a COIL apparatus.

BACKGROUND OF THE INVENTION

The chemical oxygen-iodine laser (COIL) is a short wavelength high-power chemical laser with wide ranging industrial, technological, and military applications. The COIL produces a laser beam with a 1.315-$\mu$m wavelength, which is well suited to a variety of uses. The COIL also has one of the best beam qualities of any available laser, which allows for clean cuts and welds, as well as simple beam correction and direction. In addition, the COIL laser has greater scalability than photolytic and solid state devices. COIL lasers, which are electronic transitional lasers, are favored over vibrational or rotational transition lasers because they have one of the best beam qualities of any available laser.

The COIL is powered by a fuel of molecular iodine and singlet delta oxygen ($O_2(^1\Delta)$). The singlet delta oxygen is an excited state of oxygen. When combined with iodine, the excited oxygen causes the iodine to dissociate rapidly. The oxygen and iodine are accelerated to a supersonic velocity through an expansion nozzle which creates a laser gain region. The dissociated iodine atoms release energy in the form of light within the laser gain region, thus powering the laser.

In a typical COIL laser, the singlet delta oxygen is produced through a two-step process, with the first step being the production of Basic Hydrogen Peroxide (BHP). BHP is an aqueous solution of $H_2O_2$ and MOH, where M represents an alkali metal such as lithium, sodium or potassium. BHP is generated by the combination of alkali hydroxide, typically potassium hydroxide, with hydrogen peroxide according to the formula:

$$OH^- + H_2O_2 + M^+ \rightarrow O_2H^- + H_2O + M^+ \qquad (I)$$

Singlet delta oxygen ($O_2(^1\Delta)$) is then produced by reacting the perhydroxyl ions and alkali ions of the BHP with chlorine gas according to the formula:

$$Cl_2 + 2O_2H^- + 2M^+ \rightarrow H_2O_2 + 2MCl + O_2(^1\Delta) \qquad (II)$$

In this typical COIL system, a feed containing singlet delta oxygen is utilized as fuel for the laser until its readily usable quantities have been depleted. After being used in the lasing process, the remaining by-products of $H_2O_2$, KCl, KOH, and water are recycled to form fresh BHP.

Up to this point in time, COIL-type lasers have typically used BHP in the process described above to produce the singlet delta oxygen that is necessary to fuel the laser. There are two basic problems with this process. The first is that, in order to recycle the by-products of reaction (II) to make fresh BHP, a number of cumbersome, efficiency-reducing chemical steps, some of which are described above, are necessary. The second problem with the process is that BHP is unstable and corrosive. In light of these two problems, what is needed is a COIL system capable of producing singlet delta oxygen without using BHP. Further needed is a COIL system that converts laser waste products to laser fuels using only a few simple and efficient steps.

SUMMARY OF THE INVENTION

The invention is a method of utilizing lithium hypochlorite and hydrogen peroxide to generate singlet delta oxygen, which is used as fuel for a COIL device. The lithium hypochlorite is a much more stable reactant than BHP, resulting in safer singlet delta oxygen production than with previously known methods using BHP. The invention also comprises a method of regenerating lithium hypochlorite from the side products of singlet delta oxygen production. Such regeneration is simpler than the regeneration of BHP byproducts, potassium chloride and water, which makes the overall lithium hypochlorite cycle a more efficient alternative to the BHP based COIL devices of the past.

Singlet delta oxygen is produced according to the equation:

$$LiOCl + H_2O_2 \rightarrow LiCl + H_2O + O_2(^1\Delta) \qquad (I)$$

where the hydrogen peroxide ($H_2O_2$) is preferably supplied as a vapor and the LiOCl is supplied as a LiOCl-rich LiOCl/LiCl aqueous solution. Water is removed from the LiCl-rich LiOCl/LiCl aqueous solution byproduct stream and the LiCl in the byproduct stream is regenerated under basic conditions according to the equations:

$$Li^+ + Cl^- + 2OH^- \rightarrow Li^+ + OCl^- + H_2O + 2e^- \qquad (IIa)$$

and $$H_2O + \tfrac{1}{2}O_2 + 2e^- \rightarrow 2OH^- \qquad (IIb)$$

The water that is removed from the byproduct stream is converted into hydrogen peroxide through a catalytic, electrochemical, or chemical process. Thus, the LiOCl based fuel cycle forms a true recycled laser fuel supply loop. Production of singlet delta oxygen is efficiently accomplished through use of the reaction of LiOCl with hydrogen peroxide.

An advantage of the process over prior processes of powering COIL lasers is that the invented system allows the production of the liquid components from the system by-products and residual liquids without any significant separation processes. The predominant separation processes are separation of water from solution. The water removal can be accomplished with a simple evaporation step, thereby increasing the efficiency of the process.

BRIEF DESCRIPTION OF THE DRAWINGS

Figure 1:
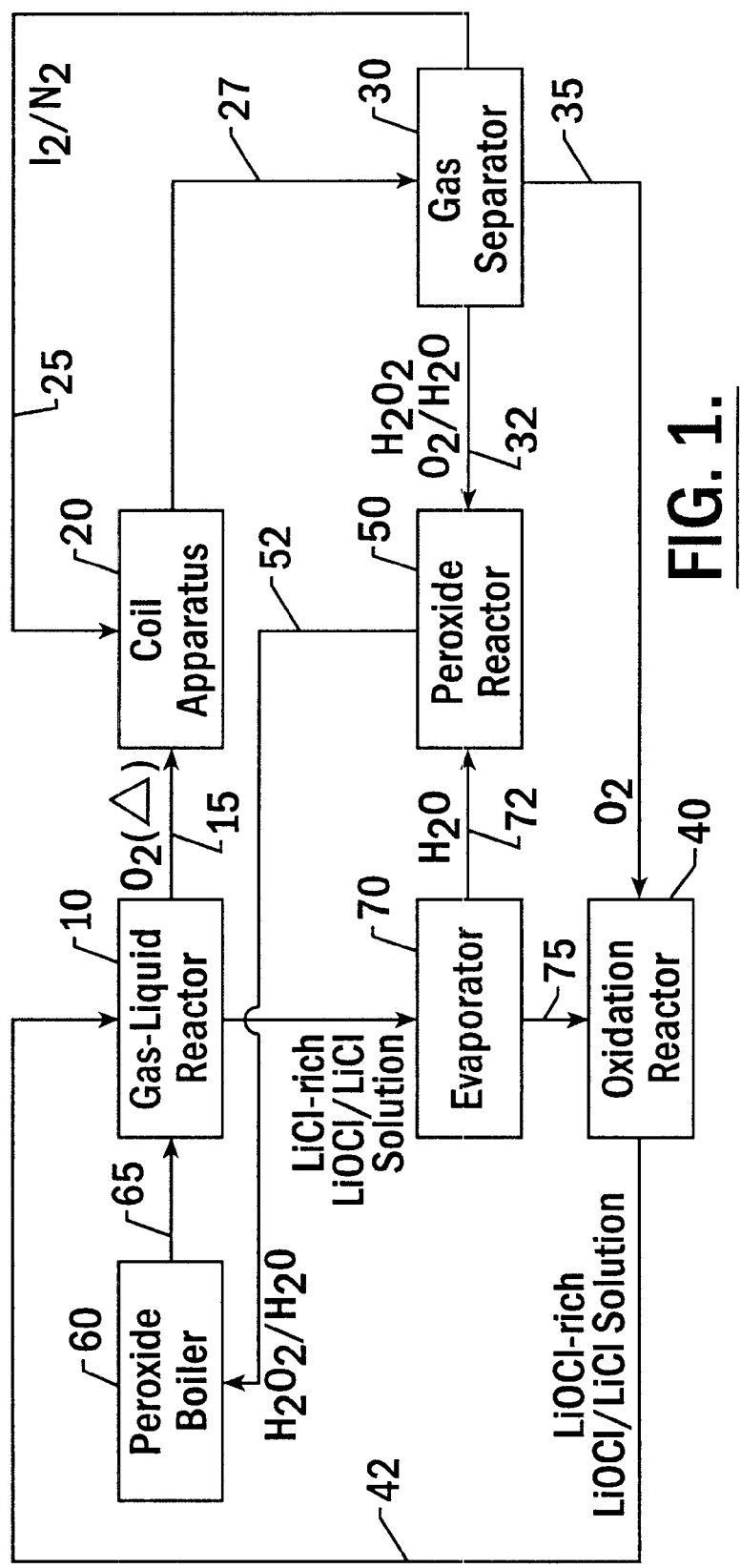

Having thus described the invention in general terms, reference will now be made to the accompanying drawing, which is not necessarily drawn to scale, and wherein:

FIG. 1 is a process diagram of an embodiment of the invented method.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, singlet delta oxygen is produced by the invented method by reaction of an LiOCl-rich, LiOCl/LiCl aqueous solution with vaporized hydrogen peroxide within a liquid-gas reactor 10 to form LiCl and water plus singlet delta oxygen as shown in Equation I:

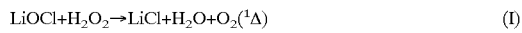

$$LiOCl+H_2O_2 \rightarrow LiCl+H_2O+O_2(^1\Delta) \qquad (I)$$

The combined LiOCl and LiCl within the aqueous solution 42 is preferably present within the range of 4 to 7 moles per liter and the lithium chloride is preferably present in a ratio of 1:7 or less (LiCl:LiOCl).

As used herein, "LiCl-rich" and "LiOCl-rich" are relative terms defining the relative amounts of LiCl and LiOCl present within a solution. In general, a newly regenerated and oxidized LiOCl/LiCl solution is said to be "LiOCl-rich". After reaction with a peroxide in accordance with equation (I), much of the LiOCl has been converted to LiCl. Thus, the resulting solution is said to be "LiCl-rich".

The hydrogen peroxide is supplied to the liquid-gas reactor 10 at a temperature and pressure which dictate that the hydrogen peroxide be vapor. The hydrogen peroxide and residual water remaining within the hydrogen peroxide stream 65 are preferably supplied at a temperature of about 40° C. to about 75° C. and a pressure of about 5 to 35 mmHg. Also, for effective generation of the singlet delta oxygen, the hydrogen peroxide should be supplied at a concentration of greater than about 30 wt %.

The reaction of lithium hypochlorite and hydrogen peroxide takes place within the liquid-gas reactor 10. In general, the liquid-gas reactor 10 provides favorable conditions for reaction of the lithium hypochlorite and hydrogen peroxide. It is desired that the vapor-phase peroxide quickly enter the reactor 10, react on the surface of the hypochlorite solution to produce singlet delta oxygen, and leave the reactor. It is not desired that the vapor-phase peroxide be allowed to intimately mix with the hypochlorite liquid, since any singlet-delta oxygen produced would tend to be quenched to its ground state while submerged in the liquid. Therefore, preferred liquid-gas reactors 10 provide for good vapor/liquid surface contact between the peroxide and hypochlorite solution without providing a large amount of gaseous dispersion within the liquid of the solution.

Also, the preferred reactor 10 provides a high liquid flowrate and a short vapor residence time. The high liquid flow rate provides cooling to the reactor, and the short vapor residence time is necessary to minimize decomposition of the singlet delta oxygen in the presence of the liquid solution.

Exemplary liquid-gas reactors include jet generators such as those described in U.S. Pat. No. 6,099,805, rotogenerators such as those described in U.S. Pat. No. 5,229,100, wetted wall generators, and spray generators such as those shown in U.S. Pat. No. 5,392,988, and particularly preferred liquid-gas reactors include spray generators which provide a large liquid surface contact area per unit volume of the peroxide vapor.

For reaction, a large excess of LiOCl/LiCl solution is maintained within the reactor 10 with respect to the vapor hydrogen peroxide. By way of example, the LiOCl/LiCl may be supplied in a 20:1 molar ratio [LiOCl:peroxide]. The molar ratios which provide the optimum reaction conditions molar ratios are determined by the particular type of reactor 10 used, the flow rates of the reactants, and the concentration of the reactant streams.

From the liquid-gas reactor 10, singlet delta oxygen is supplied to a COIL apparatus 20. The COIL apparatus 20 utilizes the singlet delta oxygen to create a laser beam as known in previous COIL devices. As shown in FIG. 1, molecular iodine is supplied via line 25 to the COIL apparatus 20 and is reacted within the COIL apparatus 20 with the singlet delta oxygen within a laser gain region, which acts in concert with an optical resonator to produce a laser beam directed therethrough. Nitrogen is also provided via line 25 to the COIL apparatus as a diluent for the iodine and also as a cooling agent to provide temperature control within the COIL apparatus 20. The stream 15 from the liquid-gas reactor 10 will also contain residual ground state triplet sigma oxygen and residual water vapor. For general information on operation of COIL devices, see Hon, J. F., et.al., AIAA Paper 94–2422.

A waste product stream 27 is directed from the COIL apparatus 20 to a gas separator 30. The product stream 27 contains large volumes of atomic iodine, atomic oxygen and residual amounts of water, hydrogen peroxide, and nitrogen. Nitrogen can be carried as a separate component, or it can be produced from air using a membrane separator.

The gas separator 10 may be any apparatus capable of separating $I_2$, $N_2$, and $O_2$, preferably through reduced temperature separation techniques. Exemplary gas separators include low temperature distillation columns and reduced temperature sorption beds. The gas separator 30 separates the product stream 27 into three streams 25, 32, 35. The first separated stream 25, which contains predominantly iodine and nitrogen, is recycled from the gas separator 30 to the COL apparatus 20. Oxygen present within the COIL product stream is separated and approximately half of the oxygen is supplied along with water as a second product stream 32 to a peroxide reactor 50. The water for use within the peroxide reactor 50 is obtained from both the product stream 32 and by separation from the depleted LiOCl solution 72. The remaining oxygen from the gas separator 30 is supplied as a third product stream 35 to the oxidation reactor 40 for production of LiOCl. Residual peroxide in the vapor phase within stream 32 will be minimal and will generally not be recovered.

The peroxide reactor 50 is used to convert oxygen and water within the second separated stream 32 to a highly concentrated hydrogen peroxide aqueous solution. The peroxide reactor 50 may be any of a catalytic, electrochemical, or chemical reactor.

An exemplary method of catalytic peroxide production is given in U.S. Pat. Nos. 5,972,305 and 5,976,486, an exemplary method of organic peroxide production is the commercially known Anthraquinone method and the method shown in U.S. Pat. No. 5,902,559, and exemplary methods of electrochemical peroxide production are given in U.S. Pat. Nos. 4,357,217; 4,384,931; 4,430,176; 5,565,073; 5,647,968; and 6,159,349.

While it is generally preferred that hydrogen peroxide be generated with an electrolytic peroxide reactor 50, a particularly preferred method of electrolytic generation of hydrogen peroxide is found in the Journal of Applied Electrochemistry 25 (1995) pages 613–627 by PC Foller entitled, "Processes for the production of mixtures of caustic soda and hydrogen peroxide via the reduction of oxygen". By using the electrolytic cell synthesis, no supplemental catalysts or organic solvents need to be maintained or supplied on site. Further, it is likely that electric current will be available when practicing this invention, either through a mobile power supply or from a portable generator.

In one embodiment of the invention, the peroxide generator forms hydrogen peroxide electrolytically from water and oxygen according to the overall reaction:

$$H_2O + \frac{1}{2}O_2 \rightarrow H_2O_2 \quad \text{(III)}$$

According to the reaction of (III) in an electrochemical cell, OH⁻ is oxidized at the anode of the cell according to the equation $2KOH \rightarrow K^+ + 2e^- + \frac{1}{2}O_2 + H_2O$. At the cathode, oxygen is reduced according to the equation $O_2 + H_2O + 2e^- \rightarrow OH^- + O_2H^-$. Potassium ions, K+, are transported across the cation exchange membrane, thereby carrying the current and balancing the charge of the OH—and O₂H- anions in the cathode.

The highly concentrated hydrogen peroxide aqueous solution is fed from the peroxide reactor 50 via peroxide supply line 52 to a peroxide boiler 60. The peroxide boiler 60 heats the hydrogen peroxide solution at a temperature and pressure which dictate that the peroxide solution becomes a vapor. The pressure within the peroxide boiler 60 is typically in the 5 to 35 mmHg range, with temperatures consistent with the boiling point of the mixture. Those temperatures will typically be in the 40° C. to 70° C. range. The vaporized hydrogen peroxide is then fed via line 65 to the liquid-gas reactor 10.

As mentioned, the liquid-gas reactor 10 has an output 15 of singlet delta oxygen to a COIL apparatus 20. The liquid-gas reactor 10 also has a by-product output stream 12 of LiCl-rich LiOCl/LiCl aqueous solution. The LiCl-rich solution is slightly more dilute, about 3 to about 5 moles per liter of LiCi and LiOCl, than the original LiOCl-rich solution, which has a total concentration of about 4 to about 7 moles per liter, due to water condensation from the peroxide vapor and transformation of condensed hydrogen peroxide to water when the oxygen is formed within the reactor 10. Thus, the combined molarity of LiCl and residual LiOCl in the solution is optionally in the 3 to 5 molar range. The dilute LiCl-rich stream 12 is typically about 70 mol % LiOCl and 30% mol LiCl.

The LiCl-rich solution is supplied to an evaporator 70. The evaporator concentrates the LiOCl/LiCl stream by removing water from the solution. Water which is removed from the LiCl-rich solution by the evaporator 70 is transferred via line 72 to the hydrogen peroxide reactor 50 where it is reacted to form hydrogen peroxide or where it is used to provide a solution to carry the hydrogen peroxide produced with the reactor 50.

The concentrated LiCl-rich solution is transferred from the evaporator via line 75 to an LiCl oxidation reactor 40. Within the oxidation reactor 40, the LiCl from the LiCl-rich solution is reacted electrochemically with the water in the LiOCl/LiCl solution 75 in the presence of oxygen supplied from the gas separator 30 via supply line 35. The water is simultaneously reacted with the oxygen to create an LiOCl/LiCl solution having high concentrations of LiOCl. The oxidation reactor produces LiOCl in accordance with Equations II(a) and II(b):

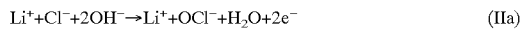

and

The oxidation reactor 40 may be any electrochemical reactor with reactions taking place on the surface of the electrodes. The liquid temperature of the reactor should be maintained in the range of 30° C. to 40° C., which is high enough to promote rapid diffusion to and from the electrodes of the reactor, but low enough to minimize decomposition of the hypochlorite within the reactor. Preferred types of oxidation reactors include electrochemical cells such as those used for the industrial production of sodium hypochlorite. Exemplary oxidation reactors are known in the art of sodium hypochlorite production as shown in P. M. Robertson, W. Gnehm and L.Ponto, *J. Appl.Electr.* 13,307(1983).

The LiOCl-rich LiOCl/LiCl solution produced by the oxidation reactor 40 is transferred via line 42 to the liquid-gas reactor 10 where it is reacted with the hydrogen peroxide from the peroxide boiler 60, thus concluding the closed cycle method of producing singlet delta oxygen for use in a COIL apparatus.

Overall, the invented system and method provides fuel for a COIL laser apparatus without the use of BHP, thereby eliminating problems associated with BHP and production thereof. Many of the past BHP recycling systems rely upon the oxidation of liquid spent fuel streams containing residual peroxide. Oxidation of the residual peroxide streams destroys much of the residual peroxide and leads to inefficiencies in the prior processes. This system allows for the simple regeneration of spent fuel by the oxidation of LiCl to LiOCl. The LiOCl is used in the liquid phase and the peroxide is used in the gas phase so that the residual peroxide stream does not need to be oxidized in the liquid phase.

Another advantage is the simplified production of the liquid fuel components from the gaseous by-products of the COIL process without any significant separation processes. The only liquid separation process is removal of water from the LiCl-rich solution leaving the gas-liquid reactor. The water removal can be accomplished with a simple evaporation step such that the overall process is quite efficient.

The invented system may be fixed or may be mobile. Since the system is designed as a closed-cycle system, large supplies of reactants do not need to be transported with the system. Electricity is the main energy input to the preferred electrolytic cells of the system, and this energy may be supplied from mobile generators or power systems. The system may be installed upon mobile platforms such as ships, land vehicles, aircraft, and spacecraft.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of providing fuel to a chemical oxygen-iodine laser (COIL) apparatus, comprising reacting a vapor-phase hydrogen peroxide solution with a liquid-phase aqueous solution of LiOCl-rich LiOCl/LiCl to form a aqueous LiCl-rich LiOCl/LiCl solution and singlet delta oxygen;

supplying the singlet delta oxygen to the COIL apparatus;

separating exhaust of the COIL apparatus into a I₂/N₂ stream, a water/O₂ stream, and an oxygen stream;

recycling the I₂/N₂ stream to the COIL apparatus;

removing a portion of the water from the LiCl-rich LiOCl/LiCl solution;

reacting the water/$O_2$ stream with the water removed from the LiCl-rich LiOCl/LiCl solution to form hydrogen peroxide;

oxidizing the LiCl-rich LiOCl/LiCl solution with the oxygen from the oxygen stream within an electrolytic cell to form the LiOCl-rich LiOCl/LiCl solution; and vaporizing the hydrogen peroxide solution prior to again react the hydrogen peroxide solution with the LiOCl-rich LiOCl/LiCl.

2. The method of claim 1, wherein the LiOCl/LiCl solution is from 4 to 7 moles per liter LiOCl/LiCl.

3. The method of claim 2, wherein the LiOCL-rich LiOCl/LiCl solution has less than 1 part LiCl per 7 parts LiOCl.

4. The method of claim 1, wherein the LiOCl/LiCl solution is from 3 to 5 moles per liter LiOCl/LiCl.

5. The method of claim 1, wherein the hydrogen peroxide is produced in an electrolytic cell.

6. The method of claim 1, wherein the hydrogen peroxide solution is greater than 30 mol % hydrogen peroxide.

7. A system for supplying fuel to a chemical oxygen-iodine laser (COIL) apparatus, comprising a liquid-gas reactor which reacts LiOCl from an LiOCl-rich LiOCl/LiCl solution and $H_2O_2$ from a hydrogen peroxide solution to produce singlet delta oxygen $O_2(^1\Delta)$ and a by-product LiCl-rich LiOCl/LiCl solution, and which provides the singlet delta oxygen as fuel to the COIL apparatus;

a gas separator which receives spent fuel by-products from the COIL apparatus and separates the spent fuel into a $I_2/N_2$ stream, a $O_2/H_2O$ stream, and a $O_2$ stream, and which recycles the $I_2/N_2$ stream to the COIL apparatus;

an evaporator which receives and removes water from the LiCl-rich LiCl/LiOCl stream from the liquid-gas reactor;

a peroxide reactor, which receives the $O_2/H_2O$ stream from the gas separator and water from the evaporator and yields a $H_2O_2$ solution stream;

a peroxide boiler which receives the $H_2O_2$ solution stream from the peroxide reactor and vaporizes the solution, thereafter supplying the vaporized solution to the gas-liquid reactor; and an oxidation reactor which receives the LiCl-rich LiCl/LiOCl solution from the evaporator and oxidizes a portion of the LiCl therein with $O_2$ from the gas separator, thereafter supplying the resulting LiOCl-rich LiCl/LiOCl solution to the gas-liquid reactor.

8. The system of claim 7, wherein the peroxide reactor is selected from the group comprising a catalytic, an organic, and an electrochemical reactor.

9. The system of claim 8, wherein the peroxide reactor is an electrolytic cell.

10. The system of claim 7, wherein the oxidation reactor is an electrolytic cell.

11. The system of claim 7, wherein the gas-liquid reactor is selected from the group consisting of a jet generator, rotogenerator, spray generator, and wetted wall generator.

12. The system of claim 7, wherein the system is assembled on a movable platform.

13. The system of claim 12, wherein the system is incorporated into an aircraft.

14. A method of providing fuel to a chemical oxygen-iodine laser (COIL) apparatus comprising:

reacting vapor-phase hydrogen peroxide with an aqueous lithium hypochlorite solution thereby producing singlet delta oxygen, and supplying said singlet delta oxygen as fuel to the COIL apparatus.

15. The method of claim 14, wherein the lithium hypochlorite solution is an aqueous LiOCl/LiCl solution.

16. The method of claim 15, wherein the LiOCl/LiCl solution is from 4 to 7 moles per liter.

17. The method of claim 15, wherein the LiOCl/LiCl solution is from 3 to 5 moles per liter LiOCl/LiCl.

18. The method of claim 15, wherein the LiOCl/LiCl solution has less than 1 part LiCl per 7 parts LiOCl.

19. The method of claim 14, wherein the hydrogen peroxide is supplied in solution which is greater than 30 mol % hydrogen peroxide.

* * * * *